Dec. 30, 1924.

H. CHIPPINDALE

HOSE WINDING DRUM

Filed Aug. 17, 1922

1,520,808

Inventor
Henry Chippindale
By Attorney

Patented Dec. 30, 1924.

1,520,808

UNITED STATES PATENT OFFICE.

HENRY CHIPPINDALE, OF RICHMOND HILL, NEW YORK.

HOSE-WINDING DRUM.

Application filed August 17, 1922. Serial No. 582,351.

*To all whom it may concern:*

Be it known that I, HENRY CHIPPINDALE, a citizen of the United States, and a resident of Richmond Hill, Long Island, in the county of Queens and State of New York, have invented certain new and useful Improvements in a Hose-Winding Drum, of which the following is a full, clear, and exact description.

Among the principal objects which the present invention has in view are: to provide an apparatus of the character mentioned with means to relieve the strain on hose at any desired point of the paying out of said hose; to provide automatic re-winding mechanism for said drum which may be set in operation by a person at a distance from the drum; and to simplify and cheapen the construction of the apparatus.

Drawings.

Figure 1:
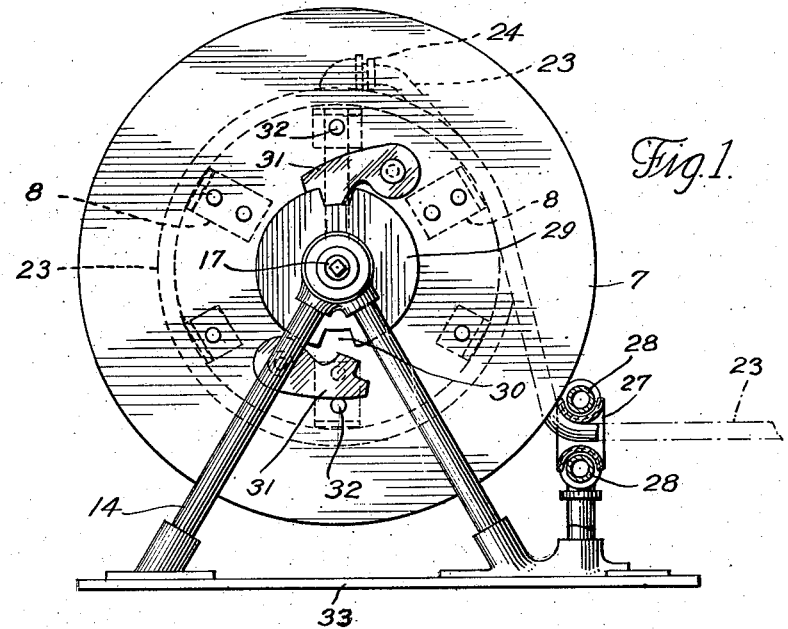
Figure 1 is an end elevation of a hose winding drum constructed and arranged in accordance with the present invention.

Description.

The present invention is particularly designed to accommodate the hose usually employed in garages and elsewhere for delivering air under pressure. At present owing to the distance of the point of attachment of the hose to the stationary fixtures of the compressed air system, the hose is permitted to light upon the ground usually charged with air under pressure owing to the fact that the air has been shut off at the delivery end of the said hose. This places the hose in position where often it is run over by moving vehicles straining, if not bursting, the hose.

Again the hose, if suspended at the air service station becomes creased or bent at a sharp angle which ultimately cracks the fabric. To overcome these conditions and give better service is the primary object of the present invention. To this end the hose is wound upon a drum, the diameter of which overcomes any tendency to crease or crack, which drum is operatively connected with the air supply system and is provided with automatic means for taking up the hose that has been paid out in service.

As seen in the drawings the drum proper consists of circular heads which are structurally connected by bridge members 8. The heads are provided with centrally located and centrally perforated hub plates 9 through which the bushing 10 and the tubular shaft 11 extend.

The bushing 10 is held by a set screw 12 or other means in the head 13 of the standard 14 which is disposed at one end of the drum. The bushing 10 forms a bearing for the shaft 11, a similar purpose being served for the said shaft at the opposite end by the head 15 of the standard 16. One end of the shaft 11 is closed by the screw plug 17, while the other is maintained in communication with the delivery tube 18 of the service pipe 19. A coupling 20 serves to seal the communication between the tube 18 and the shaft 11.

The shaft 11 is preferably split, the sections being connected by a pipe-T 21, one leg of which supports a tube 22 to which the flexible pipe 23 is suitably attached, a connection 24 being provided therefor. The coupling 24 extends slightly beyond the bridge members 8. The pipe 22 with which it is connected is held with one of the said bridge members 8 so as to gyrate or move therewith, the shaft 11 being rotated thereby.

Figure 2:
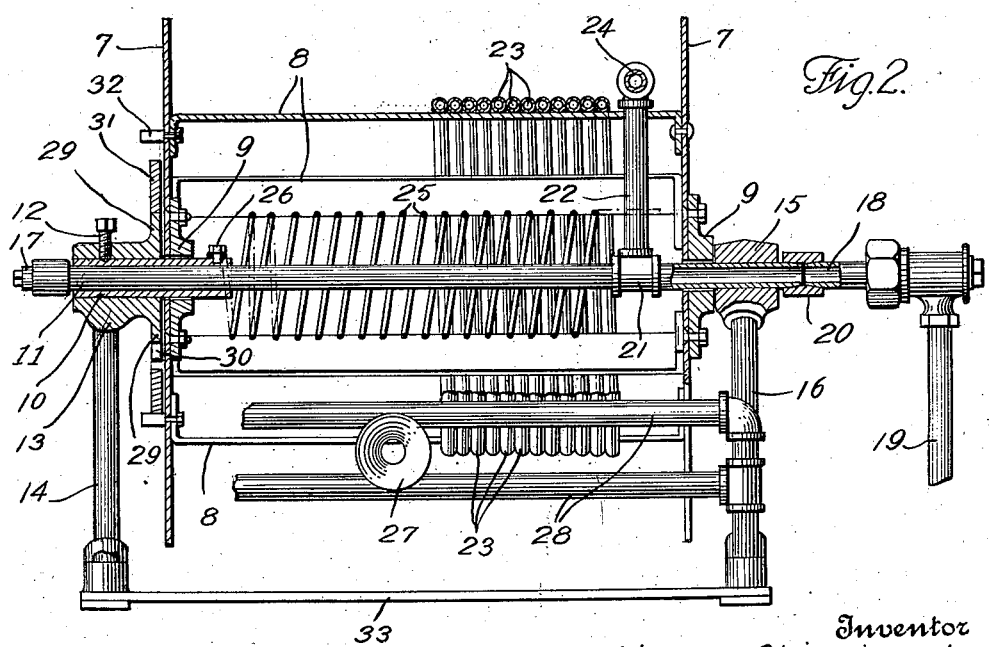
Figure 2 is a longitudinal vertical section of the same taken on the median plane thereof.

As seen best in Fig. 2 of the drawings, one end of a helical spring 25 engages the tube 22 at the one end, while the other end is engaged by a screw 26 in the bushing 10. The result of this construction is that the one end of the said spring is held stationary, while the other is caused to gyrate with the tube 22, thus winding or tensioning the said spring whenever the hose 23 is drawn from the drum, causing the said drum to rotate.

To guide the hose 23 as the same is being paid out or gathered in, a rolling thimble 27 is mounted between two guide rails 28 to freely move lengthwise thereof. As seen best in Fig. 1 of the drawings the thimble 27 is flared to an even curvature to avoid any sharp angles which might abrade the hose 23 being drawn therethrough. It is obvious that as the hose is wound or unwound upon the drum the thimble 27 will travel lengthwise between the rails 28. It is also obvious that the said thimble does not engage the two rails 28 at the same time.

The head 13 has provided thereon a flange 29 in which, as shown best in Fig. 1 of the drawings, are provided recesses 30 into which the heads of gravity dogs 31 will fall.

The stop pins 32 are provided to prevent the dogs 31 from separating too far from the periphery of the flange 29 when said dog is in a lowermost position, as is shown by the lower dog in Fig. 1 of the drawings, which is disclosed as resting on one of the said pins.

The structure is preferably provided with a base plate 33 by means of which it may be bolted on a standing structure either on the side-walks, ceilings or floors thereof. In operation the hose is normally wound on the drum, the nozzle or chuck with which it is equipped resting on the outer flare of the thimble 27. When it is wished to use the hose the same is drawn outward running through the thimble 27 until the point of use of employment is reached. Here the drum is arrested, or if drawn a little further is permitted to retract until one of the dogs 31 on the drum falls into the recess 30 at the upper side of the flange 29. This serves now to hold the drum from being retracted by the spring 25, the tension of which has been increased by the winding that was imparted to it by the rotation of the drum.

When the employment of the pipe 23 has been completed the operator by drawing the pipe quickly forward causes the rear side of the recess 30 which has been holding the dog, to kick the rear face thereof to momentarily elevate the same and to prevent its resting again sufficiently quietly in the recess 30 to arrest the retractive rotation of the drum.

If the operator now releases the pipe, the spring 25 will continue to retractively rotate the drum until the hose 23 is completely collected, the thimble 27 moving in correspondence with the increased supply of the hose from one position between the rails 28 to the end thereof, and in position to receive the nozzle or air chuck with which the hose is provided.

*Claim.*

A hose winding drum comprising a reel formed of end plates connected by longitudinal bridge members, standards at each end of said reel, a bearing rigidly secured in one of said standards, a reel shaft journalled in said bearing and standards, a member connecting said shaft and one of said bridge members, a coiled retracting spring for said reel disposed over said shaft with one end secured to said bearing and the other against said member connecting the shaft and a bridge member, a ratchet plate formed on one of said standards, and gravity dogs on the adjacent end plate of the reel for engagement therewith.

HENRY CHIPPINDALE.